(No Model.)　　　　　　　　　　　　　　　　　　2 Sheets—Sheet 1.

R. W. DIXON.
HAY TEDDER.

No. 305,578.　　　　　　　　　Patented Sept. 23, 1884.

Attest
W. T. Cushman
J. Richards

Robert W. Dixon
Inventor
by
Chase Stewart
his Attorney.

(No Model.) 2 Sheets—Sheet 2.
R. W. DIXON.
HAY TEDDER.
No. 305,578. Patented Sept. 23, 1884.
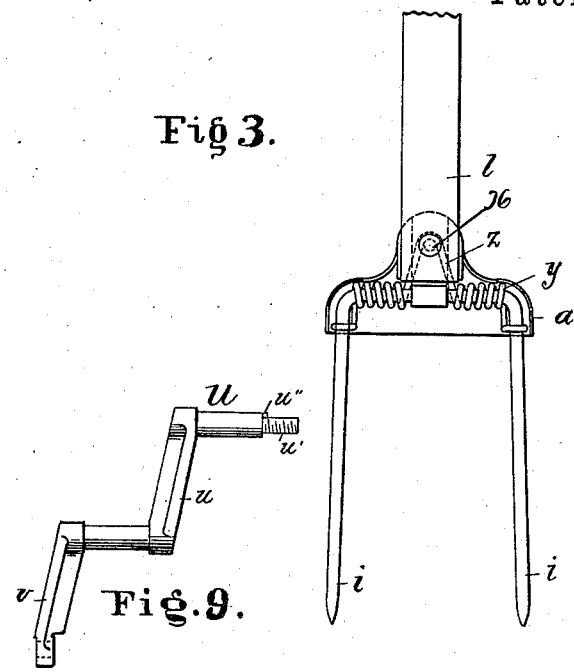
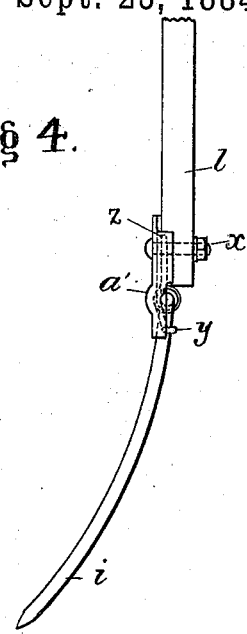
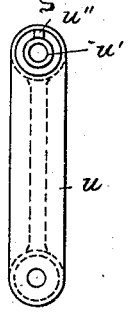
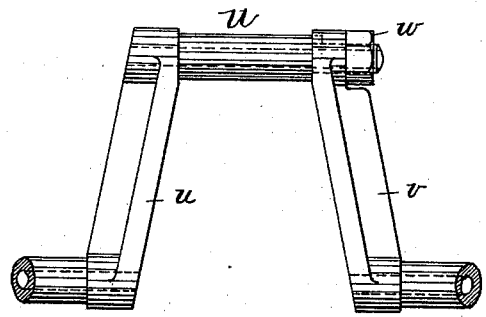
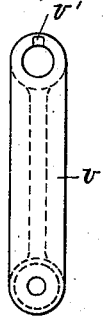
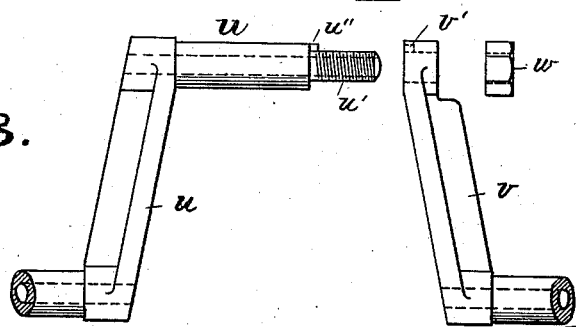
Attest
W. S. Cushman
J. Richards
Robert W. Dixon
Inventor
by Chase Stewart
his Attorney

UNITED STATES PATENT OFFICE.

ROBERT W. DIXON, OF SPRINGFIELD, OHIO, ASSIGNOR TO THE SPRINGFIELD MANUFACTURING COMPANY, OF SAME PLACE.

HAY-TEDDER.

SPECIFICATION forming part of Letters Patent No. 305,578, dated September 23, 1884.

Application filed December 13, 1883. (No model.)

*To all whom it may concern:*

Be it known that I, ROBERT W. DIXON, a citizen of the United States, residing at Springfield, in the county of Clark and State of Ohio, have invented a new and useful Improvement in Hay-Tedders, of which the following is a specification.

My invention consists of the construction of parts, as hereinafter described, and particularly pointed out in the claims.

Figure 1:
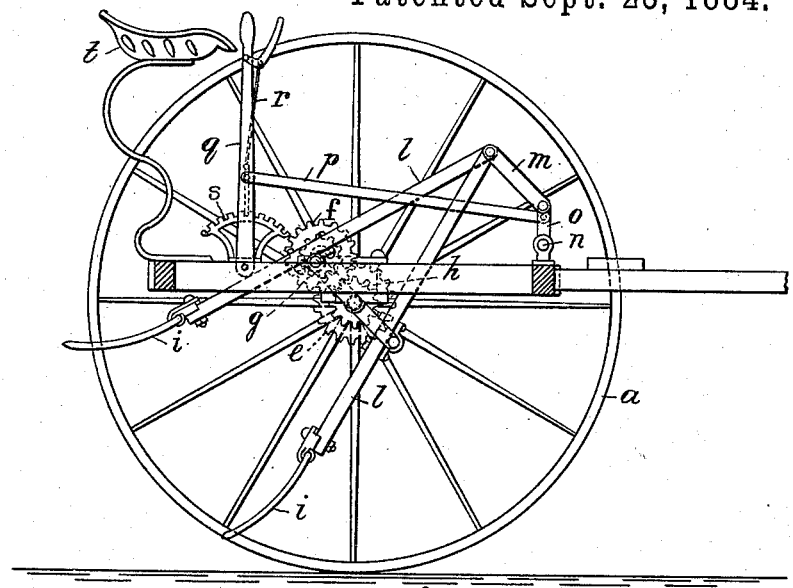
Figure 2:
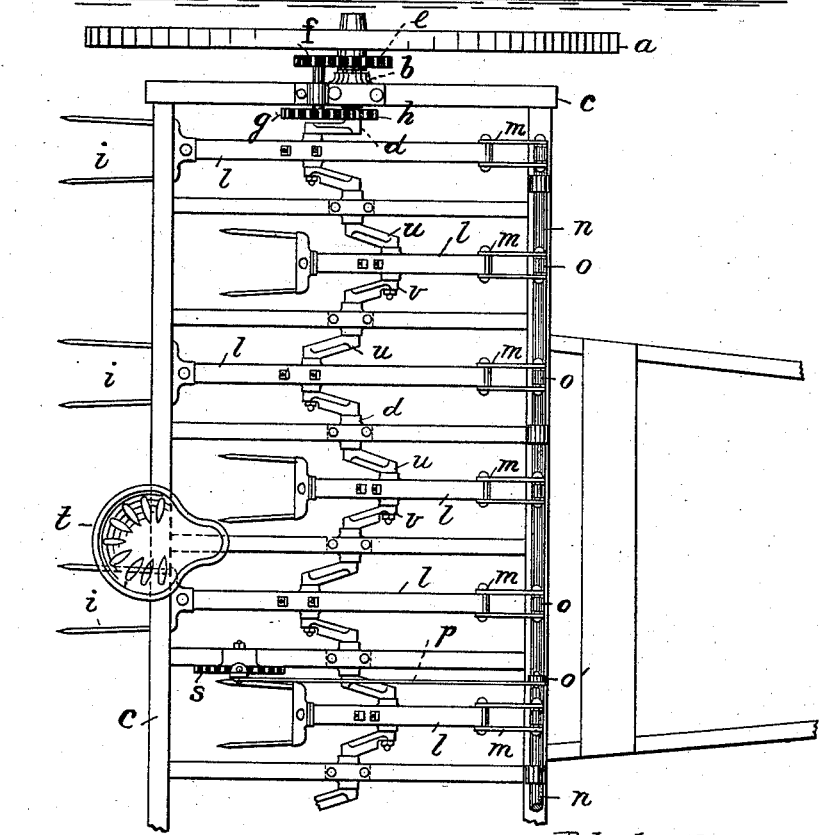

In the accompanying drawings, which form part of this specification, Figure 1 is a side elevation, partly in section, of a hay-tedder embodying my improvements. Fig. 2 is a plan view of a portion of the same. Fig. 3 is a front elevation of a tedder-tooth. Fig. 4 is a side view of the same. Fig. 5 is a view of a crank and a part of the crank-shaft. Figs. 6 and 7 are side views of the crank-arms. Fig. 8 is a view of the crank-shaft in sections, and Fig. 9 is a view of one of the sections of the crank-shaft.

In all of these figures similar letters indicate corresponding parts.

The machine is mounted upon traveling wheels $a$, which are carried by stud-axles $b$, secured to a rectangular frame, $c$. The axis of the crank-shaft $d$ is in line with the axes of said wheels, and it is drawn by the wheels through the agency of gear-wheels $e\ f\ g\ h$, the wheel $e$ being secured to the traveling wheel, the wheel $h$ to one end of the crank-shaft, and the wheels $f\ g$ to a shaft journaled on the frame $c$. The crank-shaft $d$ is not connected throughout its entire length, but is separated about its mid-length, in order that one part may work with one ground-wheel and the remaining part with the other ground-wheel. The tedder-teeth $i$ are each secured to an arm, $l$, that is operated by a crank formed on the crank-shaft $d$. The radius-rods $m$, that regulate the line of travel of the tedder-teeth, are each pivoted to a tedder-arm and to an arm, $o$, fixed to the rock-shaft $n$, and a link, $p$, is pivoted to one of said arms $o$, and to a lever, $q$, that is provided with a spring-detent, $r$, that engages with a notched sector-plate, $s$. When it is desired to change the course of travel of the tedder-teeth, so as to cause them to pass an obstruction, or for other reasons, the operator, from his seat $t$, moves the lever $q$, so as to throw the radius-rods $m$ forward, and thereby elevate the points of the tedder-teeth. These teeth may be held to any adjustment by the detent $r$ engaging with one of the notches in the plate $s$. The crank-shaft is constructed of interchangeable parts $u\ v\ w$. The part $u$ is threaded at one end at $u'$, and this threaded part passes through a perforation in the part $v$. This part $v$ is provided with a slot, $v'$, into which enters a stud, $u''$, that not only assists in making the parts more rigid, but also serves as a means for registering the varying crank-centers. When the parts are thus united, a nut, $w$, on the screw $u'$ secures the parts together. Each of these parts is provided with the arms $u\ v$, and includes the crank-pin and a portion of the shaft which is journaled in the rectangular frame $c$, as shown in Fig. 2 of the drawings. The tedder-tooth and arm are held together by a single bolt, $x$, and the tooth is yieldingly held to its work by means of a single coil-spring, $y$, that is wound around the U-shaped end of said tooth, so as to form a right and left coil, one end of which is attached to one tine of the tooth and the other end to the other tine. The middle of the spring $y$ is bent at $z$, to fit over the bolt $x$, and the whole spring is covered on the rear side by a shield, $a'$, that not only serves as a shield to prevent the hay from engaging with the spring, but also serves as a means for securing the tedder-tooth in a suitable manner to the arm. With this construction of teeth and a single spring I am enabled to manufacture a superior tedder-tooth at a much reduced cost.

Having thus described my invention, what I claim as new, and desire to secure by Letters Patent, is—

1. In a hay-tedder, the traveling wheels $a$, rotating on stud-axles $b$, secured to the main frame, in combination with a central crank-shaft in line with said axles, and intermediate gearing connected to said wheels, substantially as and for the purpose specified.

2. In a hay-tedder, the combination of the tedder-teeth, the radius-rods $m$, the rock-shaft $n$, provided with the arms $o$, the hand-lever, and a connecting-link, whereby the course of said tedder-teeth may be changed, substantially as specified.

3. In a hay-tedder, the combination of the arms $l$, tedder-teeth $i$, spring $y\,z$, shield $a'$, and bolt $x$, substantially as and for the purpose specified.

In testimony whereof I have hereunto set my hand this 8th day of December, 1883.

ROBT. W. DIXON.

Witnesses:
P. J. CLEVENGER,
CHASE STEWART.